United States Patent [19]

Pichler et al.

[11] 4,456,835

[45] Jun. 26, 1984

[54] METHOD OF OPERATING A LOAD FROM ALTERNATING CURRENT MAINS AND CIRCUIT ARRANGEMENT THEREFOR

[76] Inventors: Heinrich Pichler, Saileröckergasse 38; Hermann Dum, Bockkellergasse 8/2/8, both of 1190 Wien, Österreich, Austria

[21] Appl. No.: 328,508

[22] Filed: Dec. 8, 1981

[30] Foreign Application Priority Data

Dec. 15, 1980 [AT] Austria ................................ 6100/80

[51] Int. Cl.³ .............................................. H02J 1/02
[52] U.S. Cl. ................................... 307/107; 307/108; 307/132 E; 363/20
[58] Field of Search ........................ 307/106, 107–109, 307/132 E, 132 R, 132 M; 363/20, 21, 34, 37, 121; 323/283, 290, 299

[56] References Cited

U.S. PATENT DOCUMENTS 4,274,132  6/1981  Molyneux-Berry ................. 363/21
4,274,133  6/1981  Cuk et al. ......................... 363/20 X Primary Examiner—E. A. Goldberg
Assistant Examiner—Derek Jennings
Attorney, Agent, or Firm—Toren, McGeady and Stanger

[57] ABSTRACT

In the disclosed circuit arrangement for operating the load from alternating current lines, an inductance connected to the load serves as a first energy store. A first control switch switches the energy storage on and off in response to a regulator circuit. A second control switch connected across the inductor and a series current sensor responds to the control circuit to supply current to the load through a diode which prevents current from flowing directly from the power lines.

12 Claims, 11 Drawing Figures

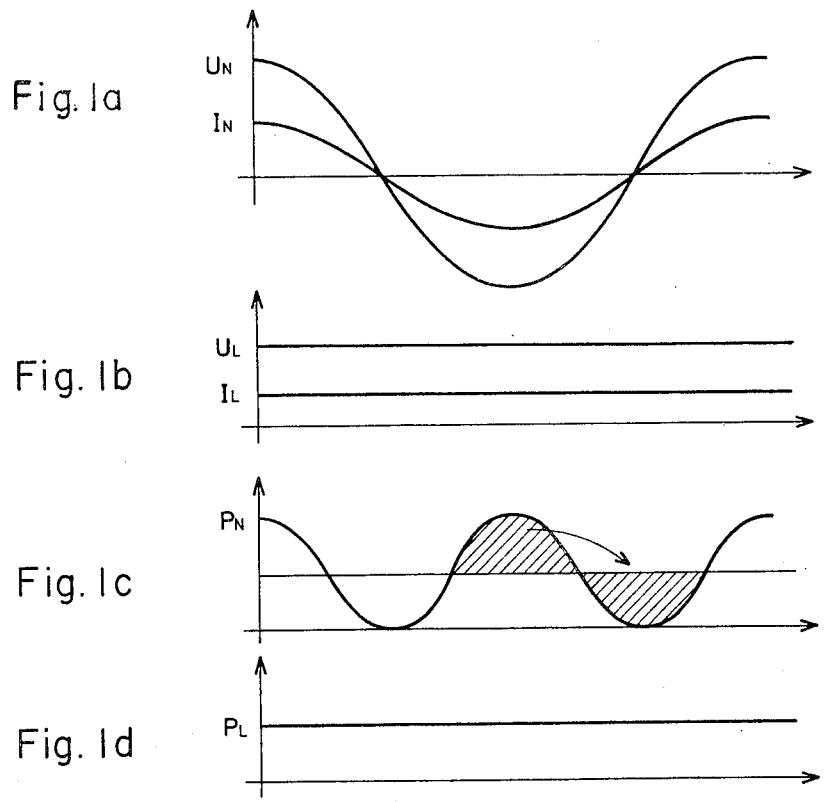
Fig. 1a
Fig. 1b
Fig. 1c
Fig. 1d
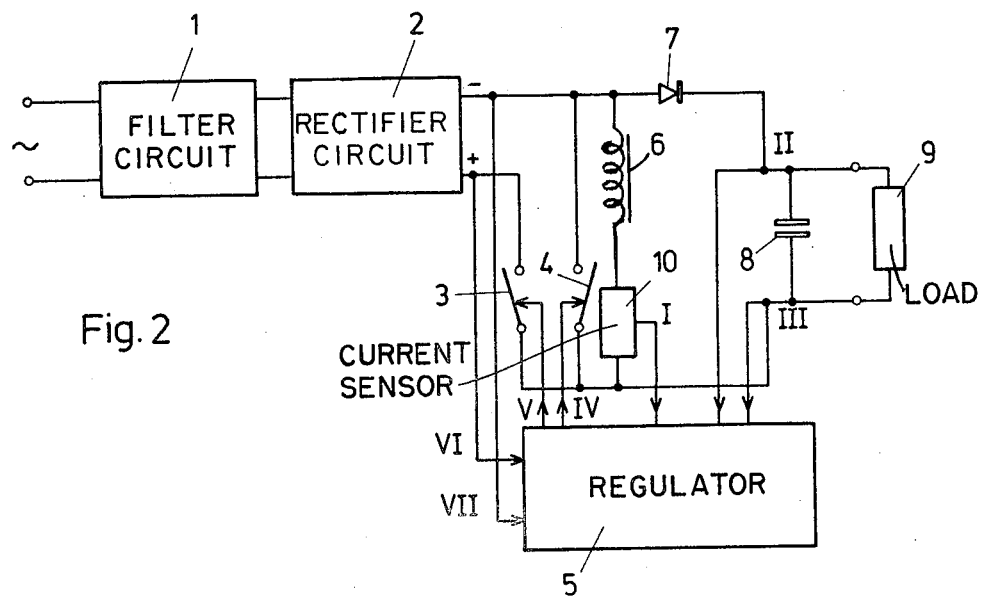
Fig. 2

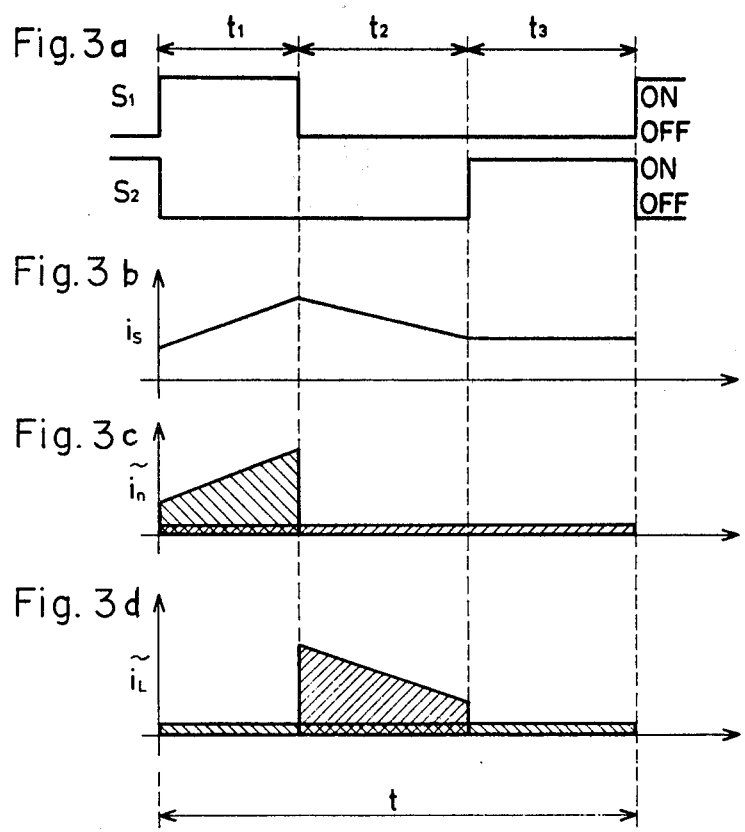
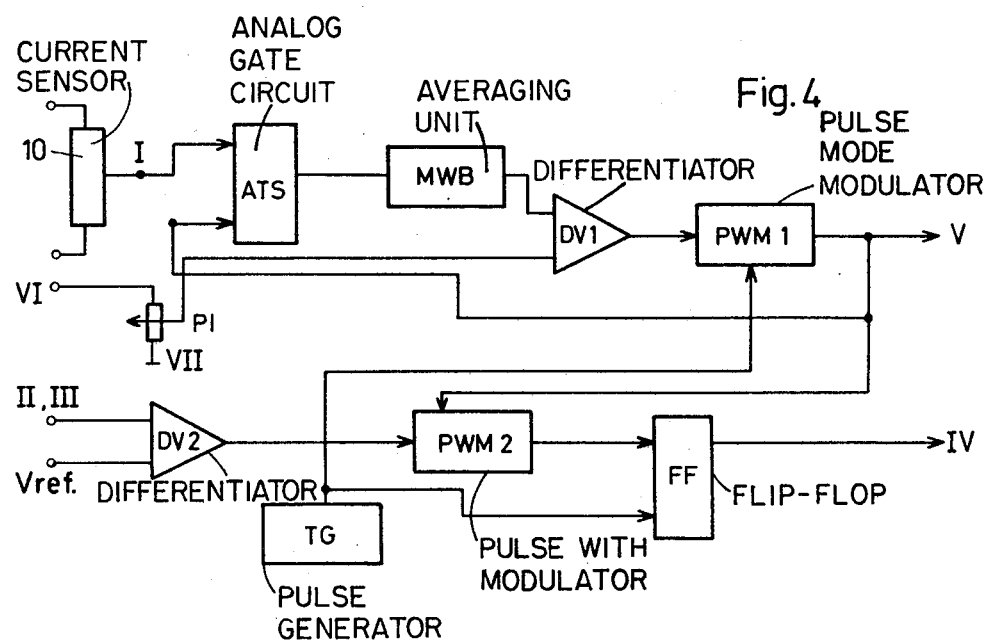

4,456,835

METHOD OF OPERATING A LOAD FROM ALTERNATING CURRENT MAINS AND CIRCUIT ARRANGEMENT THEREFOR

BACKGROUND OF THE INVENTION

The invention relates to a method of operating a load from alternating current mains, wherein a quantity of energy is withdrawn from the AC current mains in single short switch intervals, is stored temporarily and/or supplied to the load, and wherein each half wave in the AC mains is subdivided into a plurality of switch intervals. In each of these intervals, a cycle elapses during which energy is withdrawn from the AC mains, and using simultaneous intermediate storage, a quantity of energy is delivered to a final store and/or to the load, or vice versa.

For carrying out this known method, use is made mainly of so-called "high set regulators" which are composed of a rectifier circuit, a switch which effects turning on-and-off an inductor that serves as an intermediate store to or from the rectifier circuit, and which is controlled by a regulator circuit, and a capacitor which serves as a final store. Hence, a small quantity of energy is taken from the supply mains in single short switch intervals, is stored temporarily as current in the inductor, and is stored in the capacitor, until it is used up in the load. In this manner, the voltage level is converted from the actual value of the supply mains voltage to the approximately constant voltage value of the storage capacitor.

The regulator circuit forces an approximately sinusoidal variation of the mean value of the current taken from the supply mains. However, in this case, the direct voltage applied to the load is not constant, but exhibits a waviness whose magnitude depends upon the source frequency, the current carried by the load, the load voltage and the magnitude of the storage capacitance.

This makes it possible for the reaction of the operation of a load with rectified alternating current to the alternating current supply mains, particularly the occurrence of harmonics which interfere with other loads, to be kept low. However, it does result in a decisive disadvantage, namely a substantial waviness of the direct current applied to the load or, in order to keep this waviness within limits, the need for very expensive structural components, particularly the storage capacitor. Also, the storage capacitor causes considerable problems because of its large volume and, if it has to be constructed as an electrolytic capacitor, its limited service life.

SUMMARY OF THE INVENTION

It is the object of the invention to avoid these disadvantages and to propose a method of the above-mentioned type, which, on the one hand, ensures a sinusoidal variation of the current taken from the alternating current supply mains and a very small waviness of the direct voltage applied to the load, even when small capacitances serve as final stores.

In accordance with the invention, this is ensured by essentially adjusting the current averaged over an entire switch interval and taken from the AC mains during the energy withdrawal to the current value suitable for maintaining a sinusoidal variation of the mains current during the switch interval.

In a further feature of the method according to the invention, during each cycle elapsing in the switch intervals, a residual amount of the temporarily stored quantity of energy is maintained when the delivery of energy to the final store and/or to the load is interrupted.

It is particularly advantageous to take the quantity of energy from the rectified AC mains.

In this manner, the withdrawl of current from the AC mains adapted to the sinusoidal variation of the current taken from the mains results in an extremely slight reaction of the rectification on the mains. In addition, supplying very small quantities of energy to the final store in very short intervals, ensures a constant voltage at the fiinal store, and thus, the voltage applied to the load, even if the final store has only a small capacitance. This is because the quantities of energy transported are small. In addition, when the final store has very small capacitance values or is not present at all such as in the case of loads having small capacitances due to their structural designs, for example, winding capacitances, the voltage of the final store remains practically unchanged by the supply of such a small quantity of energy during a switch interval and, on the other hand, these quantities of energy are supplied in such short intervals that the supply could be called quasicontinuous. In the method according to the invention, a final store may not even be required when the load has sufficient integrating properties.

Another object of the invention is to provide a circuit arrangement for carrying out the method according to the invention.

In a circuit arrangement having an inductor serving as intermediate store and connected to a final store and/or to the load, and having at least one switch controlled by a regulator circuit for connecting and disconnecting the intermediate store, this object is met in accordance with the invention by providing a further switch which is connected to the regulator circuit and is connected in parallel to a series connection composed of the inductor and a current sensor whose signal output is connected to the regulator circuit, and by making it possible that this series connection can be connected to the AC mains over one or more switches controlled by the regulator circuit.

This measure assures that the load, or device serving as final store, is never supplied directly by the AC mains, but only by the intermediate store formed by an inductor, and, thus, the final store is not subjected to voltage variations. The switch provided in addition to the series connection which includes the current sensor and the inductor, make it possible to maintain a phase in the cycle of a switch interval during which current is neither taken from the mains nor is current supplied to the load, and only the residual energy remaining in the inductor is practically maintained, while the attentuation caused by unavoidable ohmic losses remains negligible when this circuit is appropriately dimensioned. This makes it possible in a very simple manner to bring the mean value of the current taken from the mains during a switch interval to exactly that level which is required for insuring that the variation of the current supplied to the arrangement is sinusoidal and in phase with the voltage.

According to another feature of the invention, the series connection including the inductor and the current sensor is connected via a diode to the load and/or the final store. This diode prevents the direct flow of current from the AC mains to the load and/or to the final store. Furthermore, a rectifier circuit can be provided. The latter can be connected via a controlled switch to the inductor serving as the intermediate store.

In accordance with another feature of the invention, the switch that optionally connects the series connection to the rectifier circuit is controlled by a pulse width modulator circuit whose input is connected to a desired value generator for the mains current, preferably a voltage divider connected to the mains, and which is connected to the current sensor over an analog gate circuit and an averaging unit connected to the latter.

This measure ensures a pre-processing of the mains current by the signal utilization in the analog gate circuit and the series-connected averaging unit for obtaining a sinusoidal variation, the analog gate circuit making it possible for the acutal value of the mains current to be picked up only during the first phase of a switch interval during which the intermediate store is being charged. This further ensured that the time during which the switch effecting the connection between the rectifier circuit and the series connection including the inductor is switched on within a switch interval of the current taken from the supply mains corresponds exactly to the load current corresponding to the mains voltage and necessary for obtaining its sinusoidal variation for the switch interval.

Furthermore, it is advantageous if the switch arranged parallel to the series connection is controlled by a flip-flop circuit whose set input is connected to a pulse width modulator circuit whose input, in turn, is connected to the control line of the switch and to a differential amplifier comparing desired value with actual value, and whose reset input is connected to the pulse generator. As a result, as soon as the connection between the rectifier circuit and the series connection including the inductor is interrupted and, therefore, the discharging of the inductor serving as intermediate store begins and the difference between the actual value and the desired value of the direct voltage applied to the load falls below a minimum value, which is equivalent to a sufficient energy delivery to the load circuit, the further delivery of energy is interrupted until the switch interval determined by the pulse generator has elapsed.

BRIEF DESCRIPTION OF THE DRAWINGS

The invention is explained in more detail with the aid of the drawings.

FIGS. 1a through 1d show various diagrams of the variations of voltage, current and power in the network and at the load;

FIG. 2 is a basic circuit diagram of a circuit arrangement according to the invention;

FIGS. 3a-3d are diagrams showing the variations of various values during a switch interval;

FIG. 4 shows an embodiment of a regulator circuit; and

DESCRIPTION OF PREFERRED EMBODIMENTS

Figure 5:
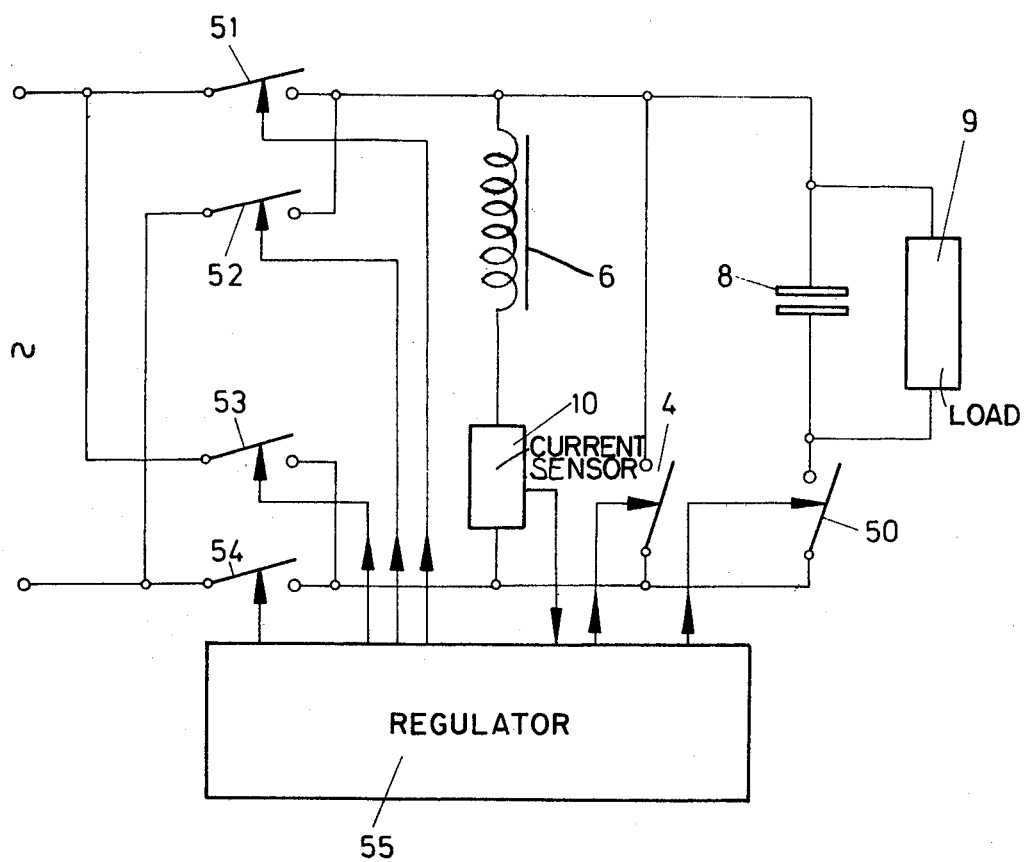
FIG. 5 shows the basic circuit diagram of another embodiment of a circuit arrangement in accordance with the invention.

A preferred embodiment of the circuit arrangement according to the invention is composed of a rectifier circuit 2, for example, realized by four diodes in a bridge circuit, a storage inductor 6, two controlled switches 3 and 4 connected in series or parallel to the storage inductor, a diode 7, a storage capacitor 8 and a regulator circuit. A high-frequency energy filter in the form of an LC network prevents reactive effects on the supply mains which could be caused by the switching operations of the switches 3 and 4.

The preferred embodiment of the invention illustrated in FIG. 2 includes a mains circuit, composed of an energy filter circuit 1, a rectifier circuit 2 and the series connection composed of a controlled switch 3 of the storage inductor 6 and a current sensor 10. Another circuit, the storage circuit, is formed by the series connection composed of the other controlled switch 4, the storage inductor 6 and the current sesor 10. Finally, the load circuit is formed by the series connection of the storage inductor 6, with the current sensor 10, a diode 7, the load 9, and a parallel capacitor 8, however, the latter is necessary for the circuit only in the event that the load 9 does not itself exhibit an integrating behavior. A regulator circuit 5 controls the opening and closing times for the load voltage and the current flowing thorugh the current sensor 10.

The principle manner of operation of the circuit is illustrated by FIG. 1.

FIG. 1a shows the variation of the mains voltage and the sinusoidal variation of the mains current enforced by the action of the regulator circuit 5. Underneath FIG. 1a, FIG. 1b shows the constant load voltage and the constant load current as direct current values.

The diagram of FIG. 1c shows the instantaneous power picked up the supply mains. The diagram shows, as a product of sinusoidal mains current and sinusoidal mains voltage, the variation of the power which is also sinusoidal and which oscillates with twice the frequency of the current taken by the circuit from the supply mains.

The average power also represents that power which is delivered to the load 9 multiplied by the efficiency of the circuit.

The main object of the circuit arrangement according to the invention is to temporarily store as current in an inductor that power/time area (energy) illustrated with shading in FIG. 1c, which is determined by that power which is picked up from the mains in accordance with the sinusoidal mains current, but exceeds the constant power delivered to the load, and to deliver this current to the load 9 as soon as the power to be delivered to the load 9 falls below the power picked up from the mains.

This manner of operation is achieved by periodically opening and closing the switches 3 and 4, so that the currents averaged over the switch period $\tau$ in the mains circuit as well as in the load circuit satisfy the required boundary conditions, such as, sinusoidal mains current and constant load current. The forms of current which occur as a result are explained with the aid of FIGS. 3a-3d. The switch interval t is divided into three portions. $t_1$ is that time period in which the mains circuit is closed, while $t_2$ is that time period in which the load circuit is closed, and, in the remaining portion $t_3$ of the switch interval t, energy is neither picked up from the mains nor is energy delivered to the load. The switches 3 and 4 are designated by the reference symbols $S_1$ and $S_2$. FIG. 3b shows the flow of the current through the inductor over time.

At the beginning of the switch interval t, switch 3 is closed while switch 4 is opened. Accordingly, the mains circuit is closed and, therefore, the current flowing through the inductor 6 increases in accordance with the law of induction, $$i_s = \frac{1}{L} \int_{t_o}^{t+t_o} U_N dt + i_{so}$$

When it is assumed that the switch interval t is short as compared to the mains period duration, the mains voltage may be considered constant during a switch interval. Thus, $$i_s(t_o + t_1) = i_{so} \frac{U_{Nt}}{L}$$

for the coil current at the end of the interval $t_1$.

In order to observe the requirement for a sinusoidal mains current, the switched-on duration $t_1$ must be determined by the regulator circuit 5 in such a way that the average value of the current taken from the supply mains during a switch interval corresponds exactly to the current corresponding to that for obtaining a sinusoidal variation of the mains voltage for the switch interval.

$$i_n = \frac{1}{t} \int_{t_o}^{t_o + t_1} i_s(t)dt = \frac{1}{t} \left[ i_{so} t_1 + \frac{U_{Nt_1}^2}{2L} \right]$$

FIG. 3c shows the variation of the mains current $i_N$ over time during a switch interval t, as well as the corresponding average taken over the switch interval t, which is apparent from the equal size of the two shaded areas.

After the end of phase $t_1$ of the switch interval, switch 3 is opened and, due to the tendency of the coil current to continue to flow in the same direction as before, the diode 7 becomes conductive and the load circuit is thereby closed. The coil current flows into the load, on the one hand, and into the storage capacitor 8, on the other hand.

When the energy stored in the capacitor 8 is large in comparison to the quantity of energy transported in a switch period, the voltage at the capacitor 8 and, therefore, the voltage at the load can be considered constant during a switch interval.

The storage current $i_S$ decreases in accordance with the law of induction until the switch 4 is closed and the current is thereby diverted from the load circuit into the storage circuit. The interval $t_2$ is selected such that the average of the load voltage, of the load current, or of the load power is constant. FIG. 3b shows the variation over time of the current flowing through the diode 7 and the average of the current derived therefrom, averaged over a switch interval.

During the breaks in the diode current, the load is supplied by the energy stored in the capacitor 8. From this, a dimensional specification can be derived for the size of the capacitor 8, depending upon the permitted waviness of the current. During the third partial interval $t_3$, energy is neither taken from the mains nor is energy delivered to the load circuit via the diode 7, rather, the magnetic energy is stored in the coil 6 as circuilar current.

FIG. 4 shows the internal circuit of the regulator circuit designated by reference numeral 5 in FIG. 2. For regulating the phase or time period $t_1$, the current sensor 10 generates a signal propoertional to the instantaneous pulse current. This signal is combined through an analog gate circuit ATS with the control signal of switch 3 and is applied to a differential amplifier DV1 over an averaging unit MWB. This signal is proportional to the actual value of the mains current. The other input of this differential amplifier DV1 receives a desired current value signal which is derived from the mains voltage or is generated synchronously with the mains voltage and which is picked up by the potentiometer PT. The output of the differential amplifier DV1 controls a pulse width modulator circuit PWM1 whose output, in turn, represents the control signal for switch 3. The pulse width modulator control circuit PWM1 is triggered by a pulse generator TG. The regulator circuit for determining the time period $t_2$ during which the load circuit is closed and for determining the load over the current path, i.e., diode 7, capacitor 8, load 9, current sensor 10 formed by a resistor and closed by inductor 6, includes a differential amplifier DV2 at whose one input there is applied a signal proportional to the instantaneous load voltage and to whose other second input there is applied a signal proportional to the desired value of the load voltage. The output of this differential amplifier DV2 controls a pulse width modulator circuit PWM2 which is triggered by the output signal of the pulse width modulator circuit PWM1. The output of the pulse width modulator circuit PWM2 is not used directly as switch control signal, but it sets a flip-flop circuit FF. This flip-flop circuit FF determines the control signal of switch 4. The flip-flop circuit FF is set by the pulse generator TG at the beginning of the next switch period. The pulse generator TG generates pulses of constant frequency and controls the two pulse width modulator circuits PWM1, PWM2 and the flip-flop circuit FF required for controlling switch $S_4$.

The circuit ensures the pre-processing of the mains current by the analog gate circuit ATS and the series-connected averaging unit MWB. For forming the actual value of the mains current, only the coil current during the time period $t_1$ may be used. This is ensured by the analog gate circuit ATS. However, without changing the regulating principle, the analog gate circuit ATS can also be replaced by a second current sensor circuit in the load circuit, which is then directly connected in series with the averaging unit.

It is unnecessary to pre-process the direct voltage which is regulated so as to be constant and this voltage can be applied directly to the differential amplifier DV1, DV2, where a comparison of desired value with actual value is carried out. Differential amplifiers are to be understood as those amplifier circuits with series-connected regulator amplifiers which determine a certain time behavior. Accordingly, this concerns itself not with simple operation amplifiers, but amplifiers with additional low-pass filter characteristics. The averaging unit can be realized by a commercially available averaging circuit. Another conceivable embodiment for this is a controlled integrator circuit in which the capacitor determining the integrating behavior can be bridged in a controlled manner. As a result, by a specified storing of current in a coil 6 or by a specified withdrawal of this energy from this coil 6, a sinusoidal variation of the mains current is obtained, as also is obtained a constant power delivered to the load.

FIG. 5 shows an embodiment of the circuit arrangement according to the invention wherein the rectifier circuit is replaced by four switches 51, 52, 53, 54 which are controlled in a sense of a rectification. These four switches also assume the function of the switch 3 according to FIG. 2 which effects the separation from the AC mains. These four switches are controlled by the regulator circuit 55 which also controls switch 4 connected in parallel to the series connection composed of inductor 6 and current sensor 10. The separation of the capacitor 8 and the load 9 from the AC mains is effected by the switch 50 which is also controlled by the regulator circuit 55.

We claim:

1. Circuit arrangement for operating a load from alternating current mains, wherein a quantity of energy is withdrawn from the AC mains in single short switch intervals, is stored temporarily and/or supplied to the load, and wherein each half wave in the AC mains is subdivided into a plurality of switch intervals, in each of which there elapses a cycle during which energy is withdrawn from the AC mains, and using simultaneously intermediate storage, a quantity of energy is released to a final store and/or to the load, or vice versa, characterized in averaging the current which is taken from the AC mains during the withdrawal of energy and over an entire switch interval and adjusting the averaged current to the current value suitable for maintaining a sinusoidal variation of the mains current during the switch interval, comprising an inductor serving as intermediate store for connection to a load, and having at least a first switch controlled by a regulator circuit for connecting and disconnecting the intermediate store, characterized in that a second switch 15 connected to the regulator circuit, said second switch being connected in parallel to a series circuit including the inductor 6 and a current sensor whose signal output is connected to the regulator circuit, and that said series connection being connectable to the AC mains through the first switch controlled by the regulator circuit.

2. Circuit arrangement according to claim 1, further comprising a diode and characterized in the series connection including the inductor and the current sensor 10 being connectable via the diode to the load, said diode being arranged for interrupting the direct flow of current from the AC mains to the load.

3. Circuit arrangement according to claim 1, characterized in a rectifier circuit connectable said first switch to the inductor serving as intermediate store.

4. Circuit arrangement according to claim 2, characterized in a rectifier circuit connectable over a controlled switch to the inductor serving as intermediate stove.

5. Circuit arrangement according claims 3 or 4, said regulator circuit including a pulse width modulator circuit, a pulse generator, a differential amplifier, a desired value generator for the mains current, an analog gate, and an averaging unit, said circuit arrangement being further characterized in that the first switch optionally connects the series circuit to the rectifier circuit is controlled by the pulse width modulator circuit whose input is connected to the pulse generator and the differential amplifier whose input, in turn, is connected to the desired value generator for the mains current and to the current sensor over the analog gate circuit and, connected in series therewith the averaging unit.

6. Circuit arrangement according to one of claims 1 to 3 or 4, said regulator circuit further comprising a flip-flop circuit, a pulse width modulator, a differential amplifier, said circuit arrangement being further characterized in that the second switch arranged in parallel to the series circuit is controlled by the flip-flop circuit FF whose set input is connected to the pulse width modulator circuit whose input, in turn, is connected to the control line of the first switch, and to the differential amplifier which compares the desired load voltage with the actual load voltage, and whose reset input is connected to the pulse generator.

7. Circuit arrangement according to one of claims 1 to 3 or 4, characterized in that the pulse width modulator is formed by a digital operating regulator circuit.

8. A circuit arrangement for operating a load from an alternating current mains comprising a first energy storage, a second energy storage a first control switch, a control circuit, a second control switch, a series circuit including an inductance and a current sensor, a diode for an inductance which serves as the first energy storage which is connected to the load, at least the first switch, being controlled by a control circuit to switch the first energy storage on and off, the second control switch being connected to the control circuit, characterized in that the second control switch is connected parallel to the series circuit having the inductance and the current sensor and having a signal output connected to the control circuit the series circuit having the inductance and the current sensor being connectable by means of the diode to the load said diode being arranged to prevent the direct flow from the alternating current mains to the load and/or to the second energy storage.

9. A circuit arrangement according to claim 8, said control circuit having a pulse width modulator, a pulse generator, a differential amplifier, a nominal frequency selector an analog gate circuit, and an averaging unit, said circuit arrangement being further characterized in that the control of the first controlled switch takes place by means of the pulse width modulator circuit which is connected at the input to the pulse generator TG and the differential amplifier DV1 which is connected to turn at its input to the nominal-frequency selector for the line current connected with the line, and is connected to the current sensor by means of the analog gate circuit the averaging unit connected in series with the differentiator.

10. A circuit arrangement according to claims 8 or 9, wherein said control circuit includes a flip-flop, a second pulse width modulator, a second differential amplifier, said circuit arrangement being further characterized in that the second control switch which is located parallel to the series circuit is arranged to the controlled by means of the flip-flop whose set input is connected to a pulse width modulator circuit which in turn has an input connected to the control line of the first control switch and the differential amplifier said differential amplifier being arranged for comparing the load desired voltage with the load actual voltage, the reset input of the flip-flop being connected with the pulse generator.

11. A circuit arrangement according to claim 8, characterized in that the pulse width modulator for control of the switch is formed by a digitally operating control circuit.

12. A circuit arrangement according to claim 9, characterized in that the pulse width modulator for control of the switch is formed by a digitally operating control circuit.

* * * * *